(12) United States Patent
Wan et al.

(10) Patent No.: US 8,576,923 B2
(45) Date of Patent: Nov. 5, 2013

(54) BITSTREAM NAVIGATION TECHNIQUES (75) Inventors: Wade K. Wan, Orange, CA (US);
Vladimir Silyaev, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1536 days.

(21) Appl. No.: 12/103,795

(22) Filed: Apr. 16, 2008

(65) Prior Publication Data

US 2009/0262867 A1 Oct. 22, 2009

(51) Int. Cl.
*H04N 7/12* (2006.01)
(52) U.S. Cl.
USPC ............ 375/240.28; 375/240.01; 375/240.08; 375/240.26
(58) Field of Classification Search
USPC .............. 375/240.01, 240.26, 240.08, 240.28
See application file for complete search history.

(56) References Cited

U.S. PATENT DOCUMENTS

| | | | |
|---|---|---|---|
| 6,222,979 B1 * | 4/2001 | Willis et al. ................... | 386/323 |
| 8,165,457 B2 * | 4/2012 | Shibutani et al. ............. | 386/330 |
| 2006/0031870 A1 * | 2/2006 | Jarman et al. ................... | 725/25 |
| 2006/0182418 A1 * | 8/2006 | Yamagata et al. .............. | 386/95 |

* cited by examiner

*Primary Examiner* — Sath V Perungavoor
*Assistant Examiner* — Geepy Pe
(74) *Attorney, Agent, or Firm* — McDermott Will & Emery LLP (57) ABSTRACT

A request may be received to navigate through a bitstream by a navigation time, the bitstream having a plurality of data sequences, each of the plurality being associated with a different presentation time of the bitstream. The navigation time may be correlated with a number of bytes from a current location of the bitstream to a target location of the bitstream. The bitstream may be navigated to reach the target location within the bitstream, based on the number of bytes. Navigation may then occur from an initial start code proximate to the target location within the bitstream to a further start code until a final start code is reached that has a timestamp which, compared to a timestamp of the current location, indicates a presentation time that corresponds to the navigation time and thereby satisfies the request.

21 Claims, 5 Drawing Sheets

BITSTREAM NAVIGATION TECHNIQUES

TECHNICAL FIELD

This description relates to processing audio-visual data streams.

BACKGROUND

Digital content, including, for example, audio and/or video streams, may be transmitted for reception, use, and enjoyment by a receiving user. For example, television shows, movies, songs, or other recordings may be transmitted across a computer network, or broadcast over the air, or transmitted by way of cable and/or satellite systems. In so doing, the digital content may be encoded, compressed, and/or modified, in order, for example, to conserve bandwidths in the various transmission schemes, and/or to speed the transmission of the audio and/or video streams.

After being encoded and transmitted, the digital content may be received by a user and decoded for use and enjoyment thereof, as just referenced. For example, a decoder may be associated with a television or associated set-top box of some sort, so that the encoded, compressed audio-video streams may be decoded and passed to the television (or other display or output device) for presentation to the user.

Such data streams often include discrete sequences of data, the location of which within the data stream may be useful to know during decoding or other processing of the data stream. For example, a discrete sequence of data may include some or all of the data for a particular video frame, audio frame, or image. It may be useful to designate such sequences with easily-recognizable data, such as a start code, which indicates the beginning of (and other information regarding) the sequence of data. Thus, insertion of a start code into such a data stream at the beginning of a sequence of data may facilitate decoding, synchronizing, or other processing of the sequence and/or the data stream as a whole.

Additionally, it is often desirable for a user to be able to navigate to different locations of the digital content. For example, a video viewer may wish to jump ahead to a future portion of a program, or jump backwards to an earlier portion, or to navigate more-or-less continuously through the program in either direction.

Conventional techniques exist that allow limited ability in this regard. For example, an audio/video bitstream may include information (such as a size of a current, previous, or following data sequence(s)) that allows the user to move consecutively from one start code to the next, until a desired data sequence is found. In other examples, the digital content may be indexed so that users can navigate some pre-designated amount (e.g., may jump ahead by fifteen minutes, or by one-fourth of a total program, or to the next program segment) to arrive at an associated start code for subsequent decoding to begin.

However, such techniques may not be workable or sufficient in certain circumstances. For example, it may be difficult to navigate certain types of audio-visual content in a desired manner, e.g., when the content does not have an index table available for performing navigation (or when such an index table would be difficult to construct in a timely or useful fashion). Even if an index table is available, the index table may not provide a desired level of flexibility in navigating (depending, e.g., on an available number of index pointers within the index table). Consequently, users may be limited in their navigation of audio-visual digital content.

SUMMARY

The details of one or more implementations are set forth in the accompanying drawings and the description below. Other features will be apparent from the description and drawings, and from the claims.

DETAILED DESCRIPTION

Figure 1:
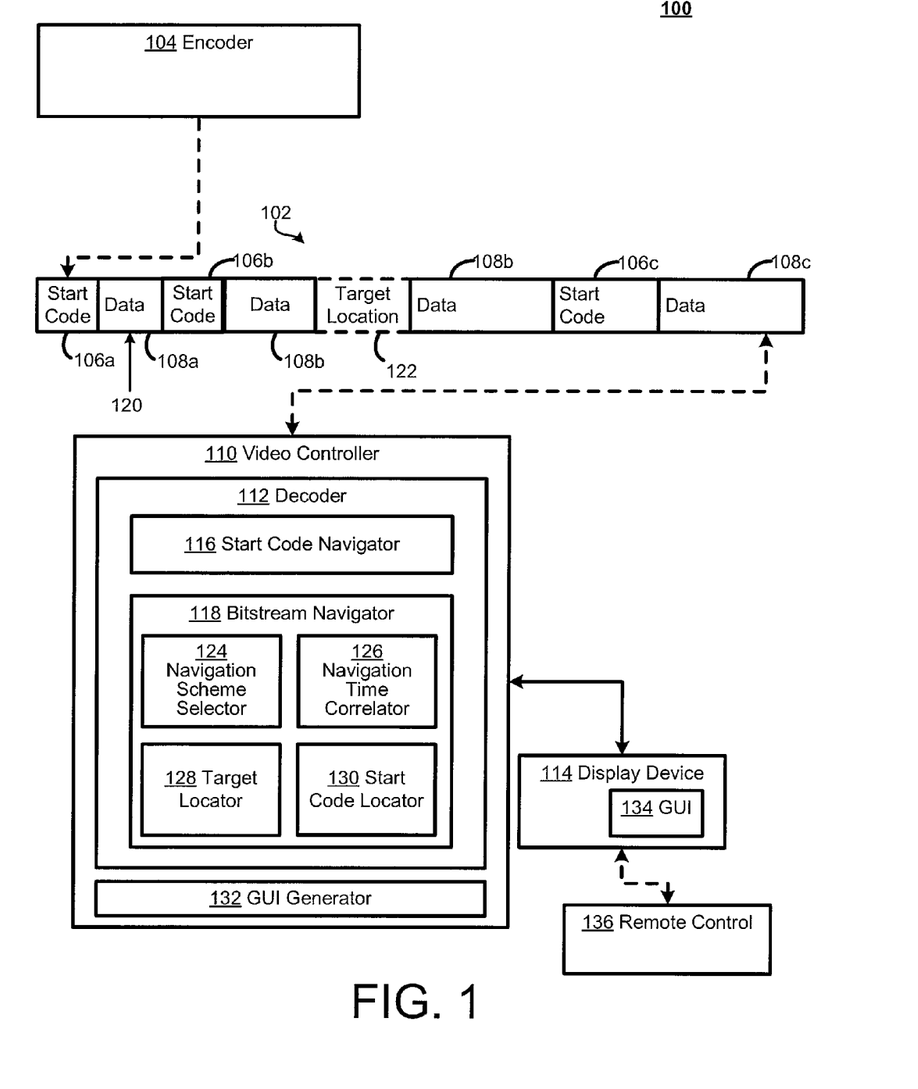
FIG. 1 is a block diagram of a system for navigating bitstreams.

FIG. 1 is a block diagram of a system 100 for navigating bitstreams. In the example of FIG. 1, the system 100 allows a user to navigate a desired duration within a bitstream 102, even if, for example, the bitstream 102 has random, variable, or non-uniform data sizes, frame sizes, or bitrates, and even if the bitstream 102 has not been indexed for navigation. For example, a user viewing a video file that is an hour long may navigate ahead within the video file some desired amount of time, such as ten minutes or twenty minutes. In this way, the convenience and enjoyment of the user may be increased for a variety of file formats, without requiring undue processing time or resources of the system 100 itself.

In FIG. 1, the bitstream 102 refers generally to transmitted and/or stored data that may include, for example, information related to television shows, movies, songs, radio programs, still pictures, text, websites, animation, or any other information that may be transmitted and/or stored for the use and enjoyment of a receiving user, including, for example, pay-per-view and/or video-on-demand movies or other programming. The bitstream 102 may represent a coded or encoded bitstream, where, for example, analog video may have been converted by an encoder 104 into digital video, according to some pre-defined or known conversion process (or where digital content of one format has been converted into digital content of another format).

As such, the bitstream 102 may be compressed, again, for example, by operation of the encoder 104. For example, the bitstream 102 may have been analyzed to remove or reduce redundancies or other data that is considered more or less extraneous for a given purpose. Such compression allows, for example, conservation of bandwidth associated with transmission of the bitstream 102, as well as efficient use of any memory associated with storage of the bitstream 102. By way of example and not limitation, then, coding/decoding standards (also referred to as codecs) and/or related container formats that may be used in the various processes described herein may include, to name a few non-limiting examples, various versions of the Moving Pictures Experts Group (MPEG) standard (e.g., MPEG-1, MPEG-2, and/or MPEG-4), Quicktime, audio-video interleave (.avi), Ogg (.ogg), True Audio (.tta), VC-1, DivX 3.11, and/or the H.264 compression algorithm (also known as H.264, and/or MPEG-4 Part 10/Advanced Video Coding (AVC), and/or "the JVT codec," where the latter nomenclature refers to the Joint Video Team involved with creation of this codec), Packetized Elementary stream (PES), and the Flash Video format (FLV).

In FIG. 1, the bitstream 102 is shown as including start codes 106a-106c, as well as corresponding/respective data sequences 108a-108c. That is, the data sequences 108a-108c may generically represent a particular, discrete sequence of data, such as a video frame, image, audio frame, a portion of an image, an image slice, a grouping of images, a grouping of audio files, or virtually any other discrete occurrence of audio-visual data. A user or downstream processor may wish to know a location of such a sequence when decoding, synchronizing, or otherwise processing the bitstream 102, so that, as referenced and described herein, the start codes 106a-106b may be used to delineate a beginning of a following data sequence, and to provide information about the data sequence that may be useful in decoding or otherwise processing the data sequence.

Figure 2:
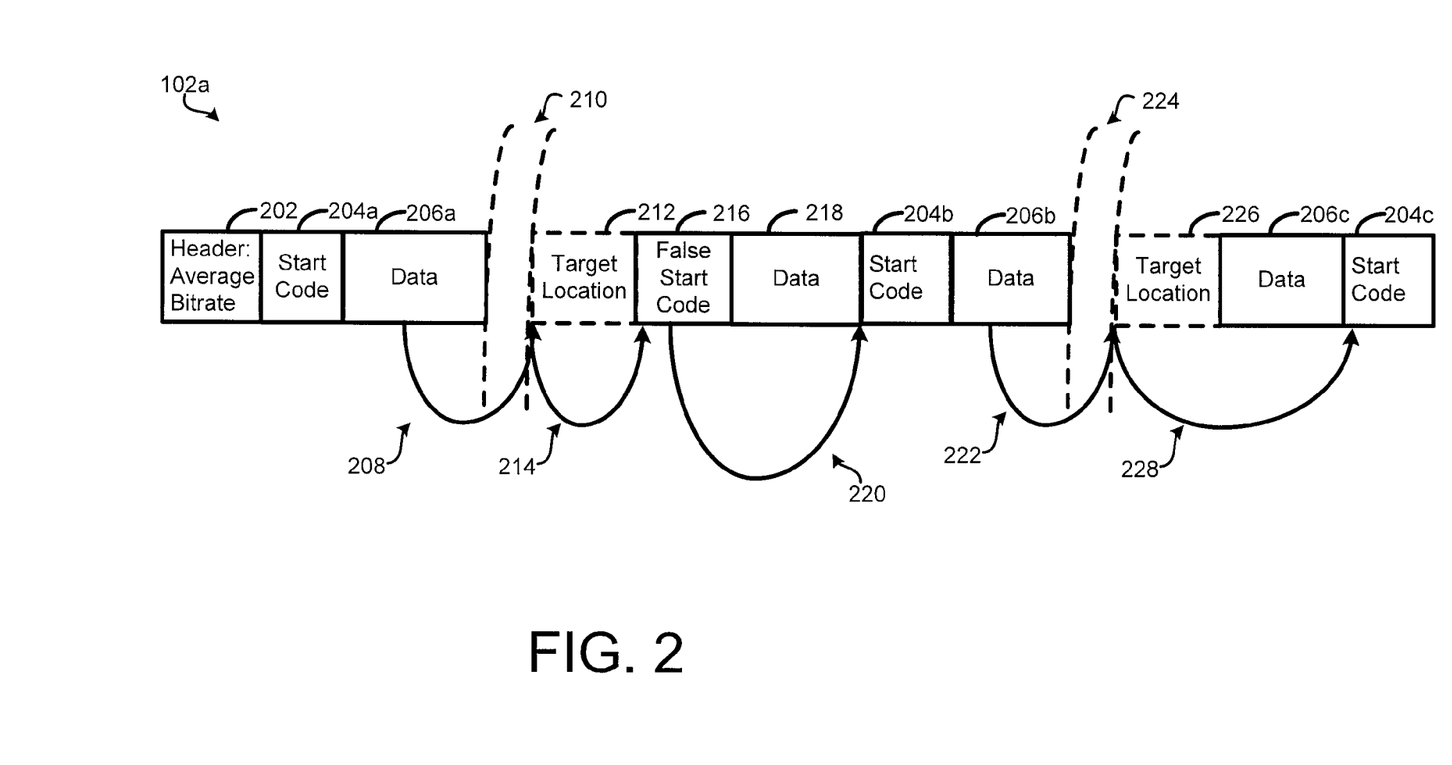
FIG. 2 is a block diagram of an example bitstream processed by the system of FIG. 1.
Figure 3:
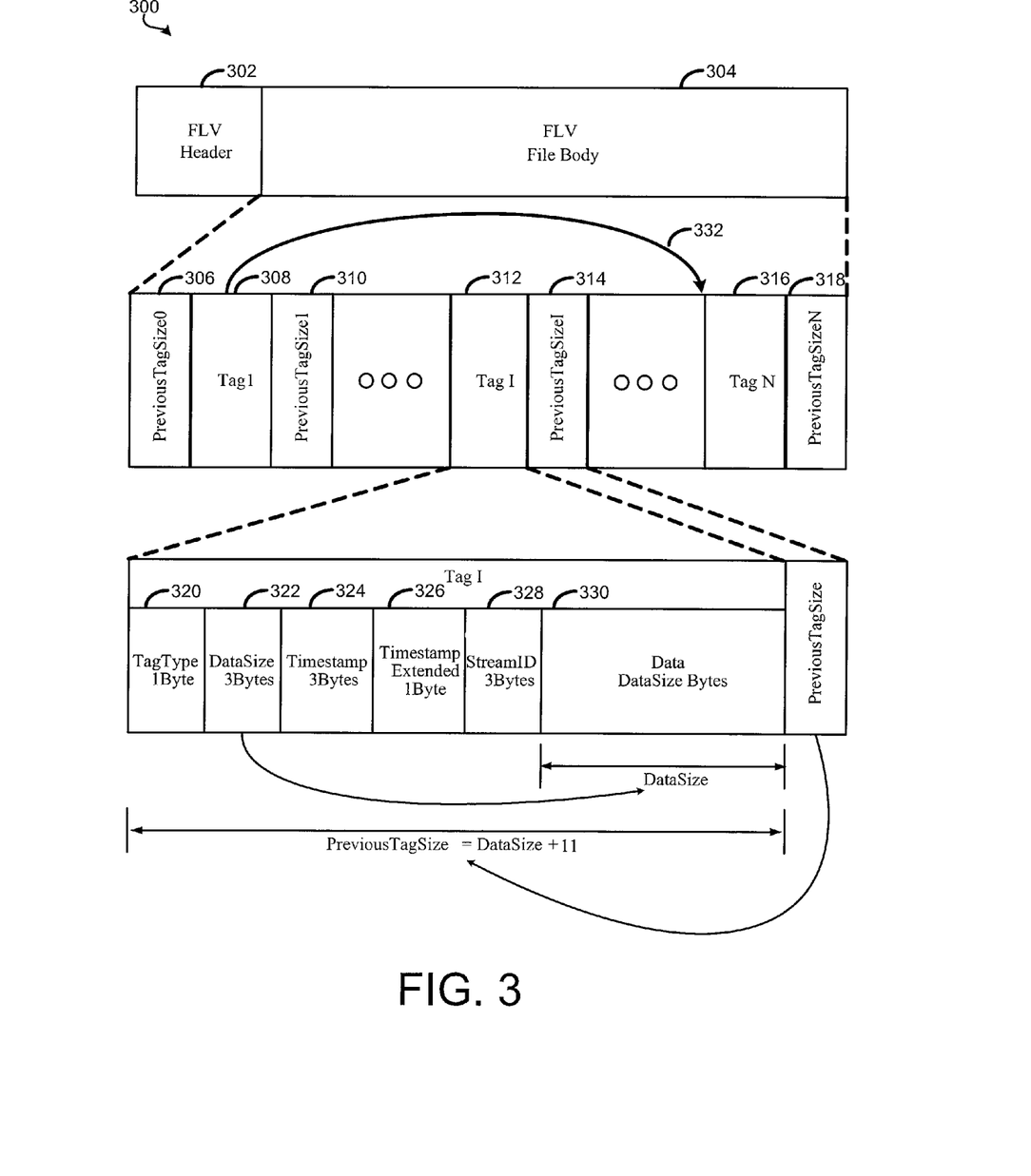
FIG. 3 is a block diagram of an example file format that may be processed by the system of FIG. 1.

In FIG. 1, the bitstream 102 is intended as a generic or conceptualized version of many different types of bitstreams that may be produced by the encoder 104. A further and more detailed conceptualization of the bitstream 102 is illustrated in FIG. 2, while an actual example of a specific bitstream format is illustrated in FIG. 3. Thus, it will be appreciated that many types of information may be included in the bitstream 102 that are not explicitly illustrated in FIG. 1, such as, for example, security (e.g., authorization) information, header information for the bitstream 102 as a whole, stream identifier information, or size information (e.g., size of a particular tag or sequence within the bitstream 102).

Once one of the starter codes 106a-106c is recognized by a video controller 110, e.g., by an included decoder 112, the bitstream 102 may be presented as audio and/or visual output at a display device 114 (e.g., a television, computer monitor, portable display, or virtually any other type of display). The video controller 110 may represent, for example, a digital video recorder (DVR) or other set-top box that may be used to receive and present audio-visual data, while the decoder 112 may perform any necessary or desired decoding or decoding-related processing associated with providing the information within the bitstream 102 to the display device 114. For example, the decoder 112 may perform decompression of the encoded bitstream 102, digital-to-analog conversion of the decompressed content, and/or other modifications designed to supplement or enhance a display or other use of the content.

Many other additional or alternative implementations are possible. For example, the decoder 112 may be implemented on, and may thus represent, a single microchip. The microchip may be optimized to process bitstreams in a particular format, e.g., including start codes or other marker codes. Consequently, any bitstreams accessed or used by the decoder 112 in such examples may benefit from implementation of the system 100 of FIG. 1.

In FIG. 1, as referenced herein, the bitstream 102 may include data having a size or rate that is not directly, easily, or uniformly correlated with a corresponding duration or presentation time of audio/video output on the display advice 114. For example, in a first bitstream, a data size of "x" bytes may correspond to ten minutes of video being presented on the display device 114, while in a second bitstream the same "x" bytes of data may correspond to fifteen minutes of video being presented. Further, within a single bitstream, data sizes/rates may vary such that a first video frame may include a first number of bytes of data and/or correspond to a first duration or presentation time of the output audio/video, while a second video frame may include a second number of bytes of data and/or correspond to a second duration being presented of the output audio/video.

Consequently, it may be difficult to predict, and thus to navigate, a desired duration within the audio/video content. In particular, such bitstreams may require some type of decoder/parser/demuxer to determine a size of each data sequence before being able to proceed to the next data sequence, thus effectively limiting navigation of the file or bitstream to one data sequence at a time. For example, in FIG. 1, a start code navigator 116 may be used as one technique for performing bitstream navigation. For example, the start code navigator 116, upon request from a user to navigate forward or back through the bitstream 102, may be used to move sequentially through consecutive start codes, e.g., moving from the start code 106a to 106b to 106c, or from 106c to 106b to 106a, until a desired start code (and corresponding data sequence) is found, and/or until the user requests an end or alteration to the navigation.

A more particular example(s) of this start code navigation technique is illustrated and described below, e.g., with respect to FIG. 3, but in general it will be appreciated that the bitstream 102 may include pointers or other information which indicates a size of a previous or upcoming data sequence, thus allowing the start code navigator 116 to locate the next consecutive start code. Then, the start code navigator 116 may check a timestamp of the corresponding data sequence in order to determine whether the data sequence is the desired data sequence. For example, if the start code navigator 116 receives a request to move ten minutes through the bitstream 102, then the start code navigator 116 may begin with the start code 106a, determine a size of the data sequence 108a to thereby jump to the next start code 106b, and then check a timestamp of the start code 106b relative to that of the start code 106a to determine whether the desired ten minutes have been processed. This process may continue in either a forward or backwards direction until the desired duration (e.g., here, ten minutes) has been reached.

In this regard, it may be appreciated that the navigation time specified by the user (e.g., ten minutes) may not correspond exactly to the navigation time through the bitstream 102 (e.g., the difference between the timestamps of the beginning/end start codes), and that the start code navigator 116 may implement rules to determine when the timestamp difference is sufficiently close to the requested time to end the navigation process. Thus, the presentation time experienced by the user of the output audio/video content as being skipped in a forward or reverse direction may not correspond exactly to the requested navigation time, although such a difference between the requested navigation time and the actual presentation time experienced by the user as being skipped may and should be too small for the user to notice or appreciate during normal viewing.

The start code navigator 116 may thus be used to provide a limited technique(s) for navigating the bitstream 102, e.g., for navigating the bitstream 102 for short durations of time requested by the user. However, navigating longer durations using the start code navigator 116 may be problematic or infeasible. For example, if a video tag consists of one frame of video, then navigating one hour ahead of video encoded at 60 frames per second would result in 216,000 tags to be processed (assuming (1 tag/frame)*(60 frames/second)*(60 seconds/minute)*(60 minutes/hour)=216,000 tags/hour)), where this number(s) references only the video data, and does not consider other information/tags such as audio and script tags which may be interleaved with the video data within the bitstream 102.

Thus, as described herein, a bitstream navigator 118 may be used to navigate relatively longer time durations within the bitstream 102. For example, if a user is viewing video content of the bitstream 102 at a location 120 within the data sequence 108*a*, and wishes to navigate ahead by twenty minutes, then the user may so designate and the bitstream navigator 118 may determine that twenty minutes corresponds to a particular or approximate number of bytes of the bitstream 102, and may then jump ahead the determined number of bytes to a target location 122, which happens to fall within the data sequence 108*b*. That is, the target location 122 may be determined to correspond to video content that is (in this case) twenty minutes ahead of the current location 120.

However, it may be difficult or impossible for the decoder 112 to begin decoding the data sequence 108*b*, without access to information contained within the start code 106*b*. Therefore, the bitstream navigator 118 may be configured to move within the bitstream 102 (e.g., in a forward or reverse direction) until a start code is reached, such as the start code 106*b* or 106*c*. In one example, the bitstream navigator 118 may use the start code navigator 116 to determine the start code 106*c*, using the technique(s) described herein. Then, the decoder 112 may proceed with decoding the remainder of the bitstream 102, beginning with the immediately-following data sequence.

By providing such coarse and fine adjustments to navigating bitstream(s), the system 100 may allow the user to easily navigate a desired duration within the bitstream 102, even for a relatively large duration of time, while still allowing the decoder 112 quick and easy access to an appropriate start code to begin decoding at the desired location. Moreover, as referenced, the bitstream navigator 118 may provide these features and advantages even when the bitstream 102 has frame or other data sizes or rates that do not correspond in a known and/or constant manner with a corresponding duration/interval/period of the audio/video presentation of the bitstream 102 on the display device 114.

In more detail of example implementations, the bitstream navigator 118 includes a navigation scheme selector 124, a navigation time correlator 126, a target locator 128, and a start code locator 130, as shown in FIG. 1. In practice, the user may be viewing (or listening to) the bitstream 102 using the display device 114, and may be at the location 120 within the data sequence 108*a*. The user may submit a request to move forward by twenty minutes within the bitstream 102.

In the first instance, the navigation scheme selector 124 may first act to determine whether it is preferable to use the start code navigator 116 or the bitstream navigator 118. For example, if the received duration of time is less than some threshold amount of time, then the start code navigator 116 may be used to move through consecutive start codes of the bitstream 102, as described above. On the other hand, if the duration of time is greater than the threshold, then the navigation scheme selector 1254 may activate the navigation time correlator 126 and thus initiate action of the bitstream navigator 118.

In the latter case, as described herein, it may be unknown as to how many bytes of data within the bitstream 102 correspond to a given unit of time, and, even to the extent it is known, such correspondence may vary from portion to portion (e.g., from frame to frame) within the bitstream 102. Therefore, in order to attempt to move forward within the bitstream 102 by the requested navigation time of twenty minutes, the navigation time correlator 126 may first correlate the requested navigation time with a number of bytes of the bitstream 102. For example, the navigation time correlator 126 may determine this correlation using data of the bitstream 102 itself, e.g., may determine an average bitrate of the bitstream 102 (e.g., across a number of frames), and may then multiply this average bitrate by the navigation time. The navigation time correlator 126 may, for example, receive and buffer a number "N" bytes of the bitstream 102 over a period of time, and then divide the buffered bytes by the amount of time spent collecting the bytes to thereby extrapolate an average bitrate for the bitstream 102 as a whole. In other examples, the navigation time correlator 126 may determine the average bitrate from a designated field of the bitstream 102 (as described below with respect to FIG. 2), or from a database or other memory (now shown in FIG. 1) in which average bitrates for various bitstreams and/or file formats may be stored.

The navigation time correlator 126 may then output the determined/correlated number of bytes to the target locator 128. The target locator 128 may be determined to locate/access the target location 122, based on the number of bytes provided from the navigation time correlator 126. For example, the bitstream 102 may be stored on a local hard drive (e.g., associated with the video controller 110, such as a set-top box as referenced above). In other examples, the target locator 128 may access a remote server, e.g., over a home network or public network, such as may occur in a video-on-demand or Internet Protocol television (IPTV) scenario. The target locator 128 may thus access the bitstream 102 at the specified target location 122.

As already described, accessing the bitstream 102 at the target location may make it difficult or impossible for the decoder 112 to begin decoding the bitstream at that location, since, unless the target location happens to correspond to a start code, the decoder 112 may not have sufficient information to begin the decoding process. Therefore, the start code locator 130 may be used to determine a start code that is proximate to the target location 122, and/or that corresponds to a desired start code (i.e., that matches the desired duration originally requested by the user, in this example of twenty minutes).

In one example, the start code locator 130 may use, or may be implemented using, the start code navigator 116. For example, the start code locator 130 may move through the bitstream 102 in a forward or reverse direction, e.g., one byte at a time, until a start code is reached. A start code may be recognized as such, and as described in more detail herein, by comparing a format of current data to known start code formats or patterns.

If the current data matches a start code pattern and is actually a start code, then the start code locator 130 may determine whether the start code is the desired start code that corresponds sufficiently well to the originally-requested navigation time from the user. For example, if the start code locator 130 locates the start code 106*c* after navigating away from the target location 122, then the start code locator 130 may compare a timestamp of the original location 120 and a timestamp of the start code 106c to determine whether the corresponding time difference is sufficiently close to the desired twenty minutes.

If not, then the start code locator 130 may implement the techniques described herein of moving consecutively through tags/frames of data and checking each consecutive start code until a start code is reached that corresponds to the desired navigation time. As referenced, in such operations, the start code locator 130 may use the start code navigator 116, or other technique, to navigate from start code to start code.

Once the desired start code is reached (e.g., the start code 106*c*), then the decoder 112 may begin decoding at that location. Consequently, the user may begin viewing or listening from the desired location, using the display device 114. As shown in FIG. 1, the user may submit the desired navigation time using an appropriate remote control 136 and/or graphical user interface (GUI) 134 associated with the display device 114. For example, in response to a selection of the user at the remote control 136 to move forward or backward within the bitstream 102, a GUI generator 132 of the video controller 110 may output the graphical user interface 134 on the display device 114 that requests a desired navigation time (and direction) from the user, which the user may then select or input using the remote control 136 and/or the GUI 134. Thereafter, the video controller 110 and/or the decoder 112 may activate the bitstream navigator 118 (e.g., the navigation scheme selector 124), to thereafter operate in the manner described herein. Consequently, the user may experience an enhanced viewing experience through improved and more flexible navigation techniques, without requiring substantial processing time or resources of the video controller 110.

FIG. 2 is a block diagram of another example of the bitstream 102 processed by the system 100 of FIG. 1, shown in FIG. 2 as bitstream 102a. In the example of FIG. 2, a header is included in the bitstream 102a that includes information about an average bitrate of the bitstream 102a. Of course, other conventional types of information may be included in the header 202 as well, such as information regarding the file format of the bitstream 102a, or information about a following group of data sequences (e.g., frames), or other information that may be useful to the decoder 112 in decoding the bitstream 102a.

As referenced above, by including information about the average bitrate in the header 202, the navigation time correlator 126 may more easily associate a received navigation time with a corresponding number of bytes of data of the bitstream 102a. As already described, such information also may be contained separately (e.g., within a memory of the video controller 110), or may be calculated by the navigation time correlator 126 based on characteristics of the bitstream 102a.

In the bitstream 102a, start codes 204a, 204b, 204c are illustrated, along with data sequences 206a, 206b, 206c. In the example, a user may view or otherwise experience the bitstream 102a on the display device 114, and, while viewing a portion of the bitstream 102a corresponding to a start location indicated by arrow 208, may request a jump forward in viewing time of twenty minutes.

As already described, the navigation scheme selector 124 may determine that this requested navigation time would be too burdensome and time-consuming for the start code navigator 116 to manage, and may thus activate the navigation time correlator 126. The navigation time correlator 126 may use the average bitrate from the header 202 to correlate the requested navigation time of twenty minutes with a corresponding number of bytes of the bitstream 102a, whereupon the target locator 128 may skip forward (as indicated by gap 210) through the calculated number of bytes to select a target location 212, as indicated by the arrow 208. For example, the target locator 128 may read data at the target location 212 from a hard drive or remote server on which the bitstream 102a is stored, or from which the bitstream 102a is being accessed.

The start code locator 130 may then proceed to locate a start code proximate to the target location 212. For example, the start code locator 130 may move forward one byte at a time through the bitstream 102a until a start code pattern is recognized, as indicated by an arrow 214. In this regard, however, it may occur that the bitstream includes, by chance, a byte sequence 216 that exactly matches the anticipated start code, labeled in FIG. 2 as a false start code 216. Consequently, when processing the bitstream 102a, it may occur that the start code locator 130 may mistake such a coincidental or false byte sequence for an actual start code. Such a mistake may lead to failures or errors in decoding or otherwise processing the received data stream.

Therefore, the start code locator 130 may be responsible for determining whether the false start code 214 is an actual start code or not. For example, the encoder 104 may be responsible for inserting designated byte sequences into the bitstream 102a, which either prevent the false positives of detecting the false start code 216 entirely (e.g., technique(s) known as "emulation prevention"), or may insert values in association with the actual start codes 204a-c which allow the start code locator 130 to detect the actual start codes 204a-c as valid start codes (and thus, by default, determine that the false start code 214 is not a valid start code). One example of the latter technique is described in U.S. patent application Ser. No.: 11/731,227, filed Mar. 30,2007 and entitled "BITSTREAM PROCESSING USING MARKER CODES WITH OFFSET VALUES," which is hereby incorporated by reference in its entirety. Of course, other techniques may be used to determine a validity of a potential start code, such as consistency checks of the potential start codes with expected values or byte sequences, e.g., relative to other portions or characteristics of the bitstream 102a, and depending on a format of the bitstream 102a.

If the start code locator 130 determines that the false start code 216 is, in fact, false, then the start code locator 130 may continue stepping through the bitstream 102a, through the data sequence 218 and as indicated by an arrow 220, until an actual start code 204b is determined (i.e., it will be appreciated that the target location 212 and the false start code 216 may be a part of the data sequence 218, and are only designated otherwise herein for purposes of this description).

The start code locator 130 may then compare a timestamp of the start code 204b with that of the start code 204a, or other timestamp or time information associated with the data sequence 206a, at which the navigation represented by the arrows 208, 214, 220 was requested. If the difference between the timestamps is sufficiently close to the desired navigation time of, here, twenty minutes, then the navigation may be completed.

Otherwise, the process may repeat, as may be indicated by arrow 222, gap 224, target location 226, and arrow 228, and ultimately with reference to determined start tag 204c. In other examples, instead of repeating the described process as implemented by the bitstream navigator 118, the start code navigator 116 may be used, since at this point the current bitstream location (e.g., the start code 204b) may correspond to a point in time that is much closer to the desired twenty minute navigation time, so that the navigation scheme selector 124 may select the start code navigator 116 to continue the navigation process to the satisfaction of the user (e.g., by checking a tag size in each start code corresponding to a size of a following tag (data sequence), then jumping to the next start code based on the determined tag size, then checking that start code to either end the process or continue the process until the desired navigation time is reached).

In yet other examples, the navigation time correlator 126 may perform an evaluation routine to evaluate a success of the navigation process of the bitstream navigator 118. For example, the navigation time correlator 126 may monitor and track how accurate (or inaccurate) the calculated number of bytes was in corresponding to the desired navigation time. One example technique for making this determination may be to monitor how long the start code locator 130 takes to locate the correct start code that corresponds to the desired navigation time. That is, if the start code locator 130 only has to traverse a small number of start codes before locating the desired start code, then the correlation of time and data size may be considered successful. On the other hand, if the start code locator 130 must traverse a large number of start codes, or must re-initiate an operation of the bitstream navigator 118 entirely to navigate the desired navigation time, then the correlation may be considered unsuccessful, whereupon the navigation time correlator 124 may calculate a new/updated average bitrate (e.g., to be used or stored, either within or not within the bitstream 102a), perhaps based in part on the extent to which the previous average bitrate was unsuccessful. Thus, the operations of the bitstream navigator 118 may be performed iteratively, so that, for example, if the user wishes to move forward at ten minute intervals through a video file, the bitstream navigator 118 may ensure that each successive navigation more accurately determines the desired ten minute interval for the current video file.

FIG. 3 is a block diagram of an example file format 300 that may be processed by the system of FIG. 1. Specifically, FIG. 3 illustrates the Flash Video (FLV) file format as an example of where the system 100 may be useful for, for example, random access and trick mode implementations.

As shown, the FLV file format may include a file header 302 and a file body 304. The file body may include an alternating series of back-pointers 306, 310, 314, 318 and tags 308, 312, 316. That is, the back-pointers 306, 310, 314, 318 are illustrated in FIG. 3 as, respectively, "PreviousTagSize0 ," "PreviousTagSize1," "PreviousTagSizeI ," and "PreviousTagSizeN," as shown. Meanwhile, each of the tags Tag 1 308, Tag 1 312, and Tag N 316 may contain, for example, one or more of audio, video, or script data. The back-pointers (PreviousTagSize) 306, 310, 314, 318 indicate the size of the previous tag, except for the first back-pointer 306 which immediately follows the file header 302, and which is typically set to 0 and not the size of the file header 302.

By indicating the size of the previous tag, and as referenced above, the back-pointers 306, 310, 314, 318 enable file navigation in a reverse direction as described above with respect to the start code navigator 114, i.e., navigating one tag at a time. Specifically, as already referenced, the start code navigator 114 may simply check a field in the tag header such as a timestamp and continue to process tags until the desired tag is reached.

This is shown in FIG. 3 with reference to Tag I 312, which includes a tag type portion 320, a data size portion 322, a timestamp 324, extended timestamp portion 326, a stream ID portion 328, and a data size field 330 having a particular data size, so that, as shown, a previous tag size in this FLV example may be equal to the data size plus 11 bytes (i.e., the total size of the portions 320-328).

Somewhat similarly, within each tag, the data size field 330 can be used to determine the size of the data payload and therefore, may be used as forward pointers to enable file navigation in the forward direction. Again, as already described, this type of navigation may be performed by the start code navigator 116, but only enables navigating one tag at a time. As in the reverse-direction example, the timestamp 324 may be used as the exit condition.

In the system 100 of FIG. 1, the bitstream navigator 118 may be used to navigate relatively larger durations of time. For example, as shown by the arrow 332, the bitstream navigator 118 may be used to move forward from a location within the tag 308 to a start of some future tag, such as the tag N 316, without having to individually navigate the intervening tags in a forward direction (e.g., as described above). For example, the bitstream navigator 118 may determine that a number of bytes from the tag 308 to the tag N 316 corresponds to a desired navigation time received from a user, and may access a memory location corresponding to the tag N 316. At this point, it may occur that the bitstream navigator 118 access the tag N 316 at a start location thereof (e.g., at a start code (not explicitly shown in FIG. 3), or the bitstream navigator 118 may access the tag N 316 within a body thereof, at which point the bitstream navigator 118 may navigate, e.g., to a start code preceding or following the tag N 316.

Figure 4:
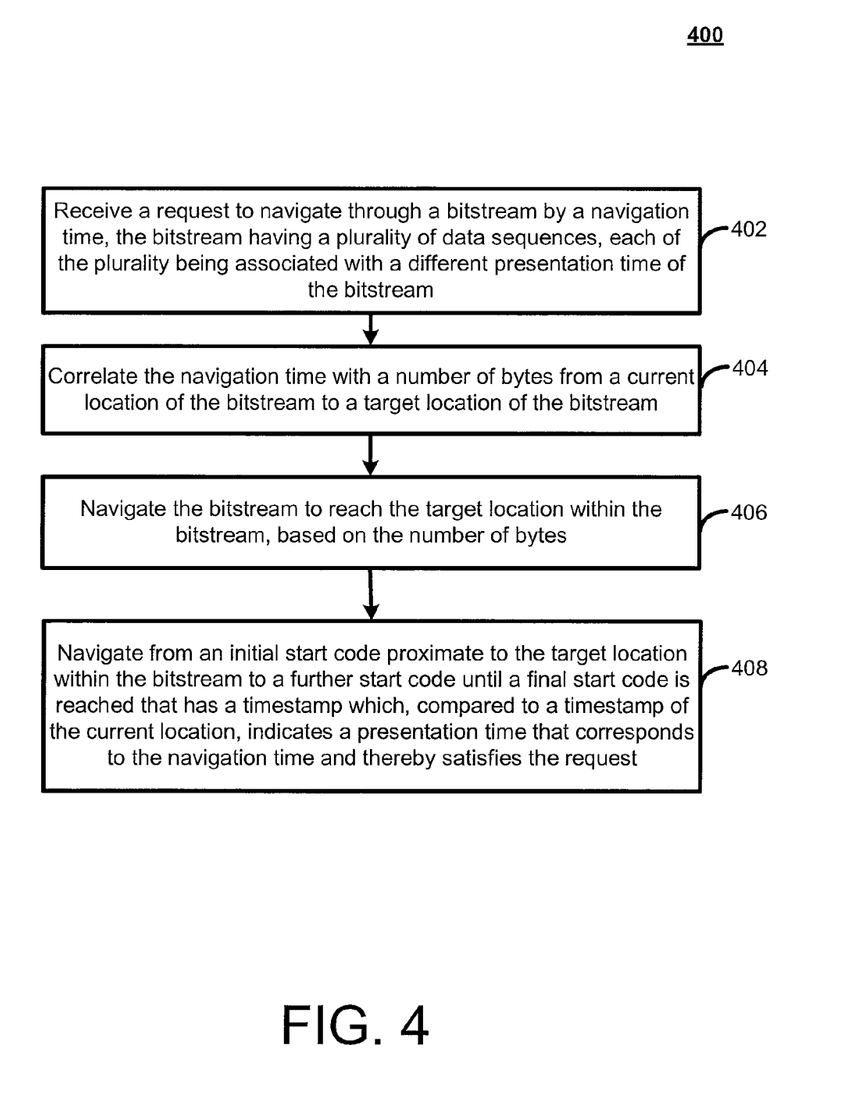
FIG. 4 is a flowchart illustrating example operations of the system of FIG

FIG. 4 is a flowchart 400 illustrating example operations of the system 100 of FIG. 1. In the example of FIG. 4, a request to navigate through a bitstream by a navigation time may be received, where the bitstream may have a plurality of data sequences, each of the plurality being associated with a different presentation time of the bitstream (402). For example, as described herein, data sequences within the bitstream 102 or 102a may have different sizes and/or rates, and/or data sequences with the same number of byes may nonetheless correspond to different presentation times (e.g., viewing or listening times) of audio/video on the display device 114. A user of the display device may use the GUI 134 or remote control 136 or other device or input method to specify a desired navigation time, i.e., a desired or theoretical time requested by the user for forward or reverse navigation through the audio/video.

The navigation time may be correlated with a number of bytes from a current location of the bitstream to a target location of the bitstream (404). For example, the navigation time correlator 126 may determine an average bitrate of the bitstream 102 or 102a and may then multiply the average bitrate by the requested navigation time to determine the number of bytes. As described, the navigation time correlator 126 may use information on a success or lack of success of a previous navigation to judge an accuracy and/or speed of previous correlations, and may update or modify the current correlation accordingly, so as to improve performance over time.

The bitstream may be navigated to reach the target location within the bitstream, based on the number of bytes (406). For example, the target locator 128 may access the desired/target location within a local or remote memory, as described above.

Navigation may occur from an initial start code proximate to the target location within the bitstream to a further start code until a final start code is reached that has a timestamp which, compared to a timestamp of the current location, indicates a presentation time that corresponds to the navigation time and thereby satisfies the request (408). For example, the start code locator 130 may proceed from the target location to an initial start code on a byte-by-byte basis, e.g., by looking for a known start code pattern. This initial search may include jumping over intervening sequences to gain efficiency if possible. For example, in some file formats certain byte sequences are known to be unique and to have a certain size (e.g., to have a beginning five or ten bit sequence that only occurs in a particular byte sequence, which itself may have some larger number (e.g., twenty or thirty bit) sequence. In such cases, as soon as the start code locator 130 recognizes the initial pattern, then the start code locator 130 may recognize the pattern and skip to an end to speed the initial start code location process. Then, as described, the start code locator 130 may begin to skip over entire data sequences (using, e.g., information contained within the initial start code about the data sequence size) to reach further start codes until the final start code is reached, the timestamp of which indicates that the presentation time of the bitstream in question will match the requested navigation time sufficiently closely.

Figure 5:
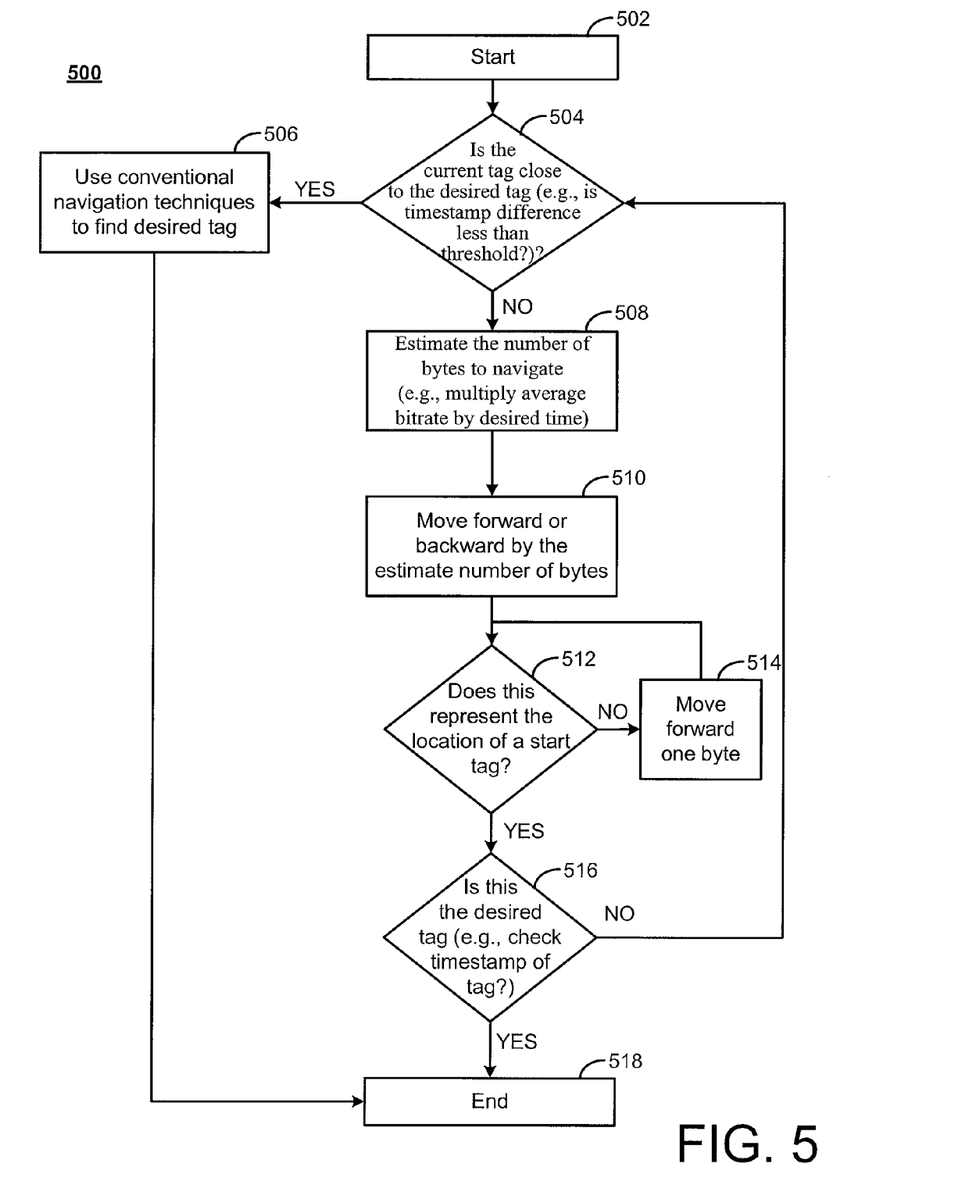
FIG. 5 is a flowchart illustrating additional example operations of the system of FIG. 1.

FIG. 5 is a flowchart 500 illustrating additional example operations of the system 100 of FIG. 1. In FIG. 5, after a start operation 502 (e.g., after receiving the request for the desired navigation time), the navigation scheme selector 124 may determine whether a current data sequence, such as a tag, is close to the desired tag (504), such as if the timestamp difference between the tags is less than some threshold. For example, a total time of a navigation operation of the bitstream navigator 118 may include a time necessary to determine whether to use the bitstream navigator 118 or the start code navigator 116, a time necessary to correlate the requested navigation time with a number of bytes of the bitstream, a time to access the target location, a time to perform a search for an initial (e.g., nearest) start code, and a time to locate the correct start code. If at least this total time does not correspond to a time that is shorter than a time that would be used by the start code navigator 116 (or other, conventional technique) to achieve the same result, then such a technique may be faster and may thus be used (506).

Otherwise, a number of bytes to navigate may be estimated (508), e.g., by multiplying the average bitrate by the desired navigation time using the navigation time correlator 126, as described. Then, the target locator 128 may move forward or backward by the estimate number of bytes (510), and it may be determined whether the resulting/target location represents the start of a tag (512), e.g., is a start code. If not, then the start code locator 130 may move forward one byte (514) and continue checking whether the next byte represents a start code (512) until a start code is reached. If the start code corresponds to the desired tag (516), as may be determined from the timestamp of the start code/tag, then the process may end (518). If not, then the process may continue, e.g., by re-checking the time threshold (504) or otherwise determining whether it would be preferable to continue with the start code navigator or conventional technique(s) (506), or to repeat the remaining operations of the bitstream navigator 118 (508-516).

Although various implementations have been described, it will be appreciated that these are merely examples, and that other variations may be implemented, as well. For example, the navigation scheme selector 124 may use additional or alternative techniques than checking a time threshold to select between navigation schemes. For example, the decoder 112 may include other navigation techniques, such as index tables/pointers, and the navigation scheme selector 124 may estimate which of two, three or more navigation schemes are likely to provide the best results (e.g., faster and/or more accurate), and may store the results of the ensuing navigations so as to improve the selection process in an iterative manner (e.g., by updating a comparison threshold or switching from one selection scheme to another). Many other examples, variations, and implementations are also possible.

Thus, while certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
a navigation time correlator configured to correlate a navigation time with a number of bytes from a current location of a bitstream to a target location of the bitstream, the bitstream having a plurality of data sequences, each of the plurality being associated with a different presentation time of the bitstream;
a target locator configured to determine the target location within a data sequence of the bitstream, based on the number of bytes; and
a start code locator configured to determine a start code within the bitstream by navigating from the target location to the start code, and configured to determine that the presentation time of the bitstream between the current location and the start code approximates the navigation time.

2. The system of claim 1 comprising:
a navigation scheme selector configured to receive a request for navigating through the bitstream by the navigation time, and configured to activate the navigation time correlator based on a determination that the navigation time is greater than a time threshold.

3. The system of claim 1 comprising:
a start code navigator configured to navigate through the bitstream by navigating between start codes based on a size of intervening data sequences; and
a navigation scheme selector configured to receive a request for navigating through the bitstream by the navigation time, and configured to select between the start code navigator and the navigation time correlator based on a determination of which will provide faster response to the request.

4. The system of claim 1 wherein the navigation time is in either a forward or reverse direction within bitstream.

5. The system of claim 1 wherein the navigation time correlator is configured to correlate the navigation time with the number of bytes by determining an average bitrate of the bitstream and multiplying the average bitrate by the navigation time to determine the number of bytes.

6. The system of claim 5 wherein the navigation time correlator is configured to estimate the average bitrate based on received bytes of the bitstream.

7. The system of claim 5 wherein the navigation time correlator is configured to access the average bitrate from a field of the bitstream.

8. The system of claim 1 wherein the navigation time correlator is configured to update the correlation of the number of bytes with the navigation time for use in a subsequent bitstream navigation, based on the determination of the start code.

9. The system of claim 1 wherein the target locator is configured to access the target location within the data sequence from a memory where the bitstream is stored.

10. The system of claim 1 wherein the start code locator is configured to navigate from the target location byte-by-byte in a forward or reverse direction until reaching a potential start code.

11. The system of claim 1 wherein the start code locator is configured to:
determine an initial start code in proximity to the target location;
compare a difference between a timestamp of the current location with a timestamp of the initial start code; and
compare the difference to the navigation time.

12. The system of claim 11 wherein the start code locator is configured to determine that the difference is substantially equal to the navigation time to thereby complete the determination that the presentation time of the bitstream between the current location and the start code approximates the navigation time.

13. The system of claim 1 comprising:
a start code navigator configured to navigate through the bitstream by navigating between start codes based on a size of intervening data sequences, wherein the start code locator is configured to locate the start code using the start code navigator.

14. A computer program product, the computer program product being tangibly embodied on a non-transitory computer-readable medium and including executable code that, when executed, is configured to cause a data processing apparatus to:
- receive a request to navigate through a bitstream by a navigation time, the bitstream having a plurality of data sequences, each of the plurality being associated with a different presentation time of the bitstream;
- correlate the navigation time with a number of bytes from a current location of the bitstream to a target location of the bitstream;
- navigate the bitstream to reach the target location within the bitstream, based on the number of bytes; and
- navigate from an initial start code proximate to the target location within the bitstream to a further start code until a final start code is reached that has a timestamp which, compared to a timestamp of the current location, indicates a presentation time that corresponds to the navigation time and thereby satisfies the request.

15. The computer program product of claim 14 wherein the correlation of the navigation time with the number of bytes is based on an average bitrate of the bitstream and on the navigation time.

16. The computer program product of claim 14 wherein the executable code, when executed, causes the data processing apparatus to navigate to the initial start code on a byte-by-byte basis from the target location, and then, when necessary to satisfy the request, navigates to one or more of the further start codes until the final start code is reached, based on a size of intervening data sequences between the start codes.

17. A method comprising:
- receiving a request to navigate through a bitstream by a navigation time, the bitstream having a plurality of data sequences, each of the plurality being associated with a different presentation time of the bitstream;
- correlating the navigation time with a number of bytes from a current location of the bitstream to a target location of the bitstream;
- navigating the bitstream to reach the target location within the bitstream, based on the number of bytes; and
- navigating from an initial start code proximate to the target location within the bitstream to a further start code until a final start code is reached that has a timestamp which, compared to a timestamp of the current location, indicates a presentation time that corresponds to the navigation time and thereby satisfies the request.

18. The method of claim 17 wherein receiving the request comprises receiving the request from a user of an output device used to present the bitstream, using an audio-video decoder configured to present the bitstream on the output device.

19. The method of claim 17 wherein correlating the navigation time with the number of bytes comprises:
- determining an average bitrate of the bitstream; and
- multiplying the average bitrate by the navigation time to determine the number of bytes.

20. The method of claim 17 wherein navigating from the initial start code proximate to the target location comprises:
- navigating to the initial start code on a byte-by-byte basis; and
- navigating, when necessary, from the initial start code to the final start code based on a size of intervening data sequences between the start codes.

21. The system of claim 1 further comprising:
- a navigation scheme selector configured to store results of navigations and use the stored results of navigations to improve a navigation selection process.

* * * * *